Figure 1:
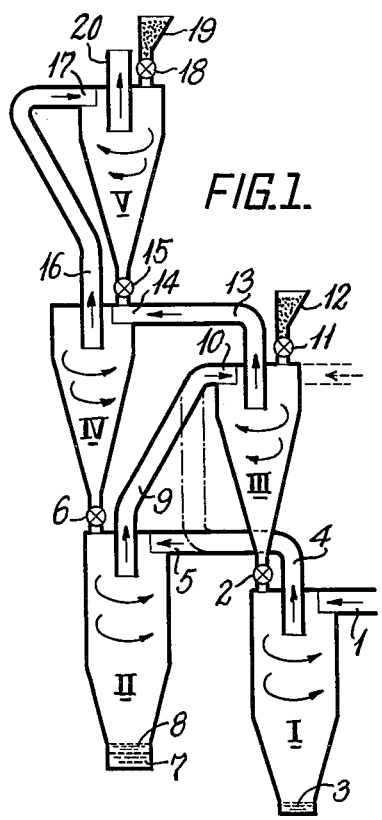

Feb. 28, 1961 YUKIO NOGIWA 2,973,260

METHOD FOR THE TREATMENT OF IRON ORES

Filed Oct. 30, 1958

INVENTOR
Yukio Nogiwa
BY
Beaman & Beaman
ATTORNEY

United States Patent Office 2,973,260
Patented Feb. 28, 1961

2,973,260
METHOD FOR THE TREATMENT OF IRON ORES

Yukio Nogiwa, 121 1-Chome Narimune, Suginami-ku, Tokyo, Japan

Filed Oct. 30, 1958, Ser. No. 770,718

Claims priority, application Japan Nov. 4, 1957

2 Claims. (Cl. 75—40)

The present invention relates to a method for the treatment of iron ores.

One of main objects of this invention is to provide a method for heating, reducing and melting iron ores in a relatively simple apparatus under good conditions with an excellent thermal efficiency.

Another object of this invention is to perform an extremely rapid and efficient heating, reducing and melting of powdered raw iron ore while suspending it in reducing hot gas currents by means of the action of cyclones.

A further object of this invention is to provide a method of adjusting temperature of reducing hot gas to be supplied to a heat-reduction furnace so as to prevent reduced iron powder from mutual caking in the heat-reduction furnace.

Still further object of this invention is to provide metallic iron powder of excellent properties by treating powdered raw iron ore with reducing hot gas current free from the impurity, such as ash resulted from the carbonaceous material for generating reducing gas.

A further object of this invention is to decrease the amount of slag forming material, such as limestone, by decreasing the amount of slag to be formed in the reduction furnace and melting furnace by feeding the reducing hot gas free from ash into both furnaces, while the amount of slag to be formed is decreased by separating ash in a separately arranged furnace for making reducing gas.

Other objects and advantages of this invention will be apparent from the following description.

In the present invention, several furnaces of the cyclone type are employed as arranged in series. For instance, a part of those furnaces is used as reducing gas generating furnaces, while the other parts of them are respectively employed as a furnace for adjusting reducing gas temperature, a reduction furnace and a melting furnace or a furnace for performing simultaneously reduction and melting, whereby powdered raw iron ore is suspended in the reducing hot gas current by cyclonic action in the heat-reduction furnace as well as in the melting furnace, thus the raw iron ore powder is rapidly heated, reduced and melted.

According to the present invention, as pulverized iron ore is continuously treated in the condition suspended in hot reducing gas current, its heating, reducing or melting is rapidly and efficiently performed and the separation of gas from the treated ore powder can be made smoothly by cyclonic function after the reaction is over, and more over, it has a good thermal efficiency and constitutes a novel method of the melting, reduction and the like of raw iron powder, while the contamination, such as ash, contained in raw material of generating reducing gas, such as carbonaceous material, for instance, coke or coal, to be used for the purpose for making reducing gas, can separately be withdrawn without being brought in contact with reduced iron powder or iron ore powder, by the separate means of the reducing gas generating furnace and reduction furance, thereby decreasing the slag amount, thus enabling to obtain metallic iron of a high quality.

On the other hand, as, in the present invention, a furnace for adjusting the temperature of reducing gas is employed and a water gas as shown in the working example referred to hereinafter may be used as the reducing gas, the temperature control of reducing gas can therefore be performed simply and accurately. A high quality metal can therefore be obtained readily and moreover, the arrangements required are simple and can be carried out in practice efficiently.

Further, in the present invention, the formation of ash and slag in the reduction and melting furnaces may be diminished by supplying the reduction or melting furnace with gaseous reducing atmosphere. Thereby, the amount of charging limestone may also be decreased.

In short, the present invention is an extremely efficient method, in which at an excellent thermal efficiency and under proper conditions the heating, reducing and smelting of powdered iron ore may be effected with a high efficiency.

Figure 3:
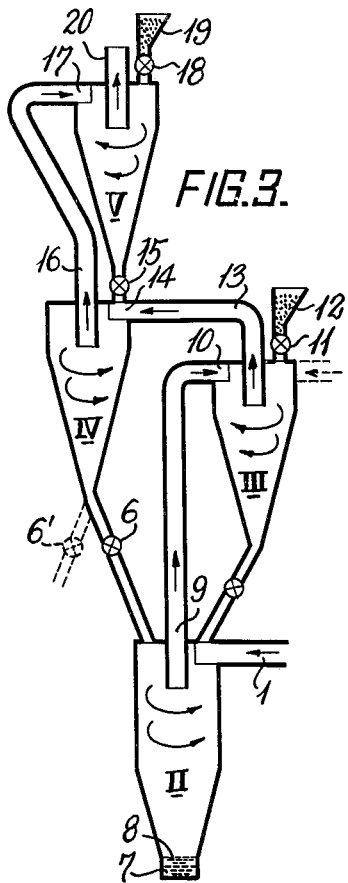
Figure 2:
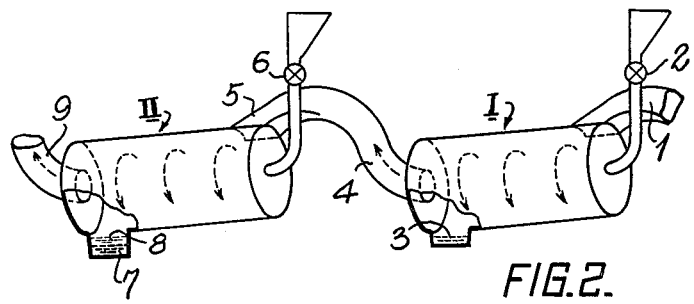

In order to enable the invention to be more readily understood, reference is made to the accompanying drawings which illustrate diagrammatically and by way of example, embodiments thereof and in which:

Fig. 1 is a longitudinal sectional view illustrating diagrammatically apparatus carrying out the method for the treatment of iron ores according to the present invention; Fig. 2 is a partial perspective view of a modified apparatus from the embodiment shown in Fig. 1, and Fig. 3 shows diagrammatically a longitudinal sectional view of a further embodiment modified from that as shown in Fig. 1.

Manners in which the method of the present invention is practiced will be illustrated in the accompanying drawings. However, it is understood, of course, that the present invention would by no means be limited by the description of the embodiments. The powdered ore to be treated in accordance with the present invention are various kinds of iron ores, such as hematite, limonite, magnetite and other iron oxide ores.

In Fig. 1 of the accompanying drawings, cyclone type furnaces made of refractory materials are represented respectively by I, II, III, IV and V, and the furnace I is a reducing gas generating furnace; the furnace II is a melting furnace; the furnace III is supplied with the source material for making reducing gas and constitutes a gas regulating furnace and the temperature of the generated reducing gas can be so adjusted in said furnace that the reducing gas thus adjusted may be blown into a subsequent heat-reduction furnace IV so as to be able to prevent the reduced iron powder or iron ore powder in said heat reduction furnace from cohering with each other and also from adhering to its furnace wall; the furnace IV is a heat-reduction furnace in which the reduction of preliminary reduced iron powder or iron ore powder as well as the heating of the pre-heated slag forming material, introduced from an anterior pre-treating furnace V are effected and the furnace V is a furnace for conducting preliminary reduction and heating, in which the preliminary heating of the powdered raw iron ore and slag forming material, such as limestone as well as the preliminary reduction of the said iron ore powder can be effected. Through the hot blast tube 1, the heated air or oxygen-containing gas is blown in the tangential direction into the furnace I (or the first furnace) at a high speed. On the other hand, the carbonaceous material, such as carbon, coke or coal, collecting itself at the bottom of the furnace III (or the third furnace) in the form of fine powder is fed continuously to the top of the said furnace I. The majority of said carbonaceous material, for instance, carbon is converted to CO gas by reaction with the high temperature air blown in through said hot blast tube 1, while another part of the carbon becomes $CO_2$ gas and withdrawn through an outlet tube 4. Since the chemical reaction referred to above is exothermic, the formed gas becomes very hot and its temperature is approximately 1800° C., which can be controlled by changing the temperature of the hot blast to be supplied as well as the proportion of hot blast and carbon to be supplied. The ratio of CO and $CO_2$ gases formed can also be controlled by changing the ratio of the respective hot blast and carbon to be supplied. The carbon supplied through a valve 2 to the top of the furnace I contains, of course, ash which, however, fuses and gathers on the surrounding furnace wall by the cyclonic action because of the high temperature of the furnace, flowing along the furnace wall downwards and collecting itself at the bottom 3 thereof, after which said ash is discharged suitably out of the furnace I. The hot gas flowing through an outlet tube 4 of the furnace I is blown at a high velocity in the tangential direction into the furnace II through an inlet tube 5. The powdered iron ore from the preliminary treating furnace V is preheated and reduced to the iron powder in the heat-reduction furnace IV (or the fourth furnace) and then fed continuously to the melting furnace II from the said furnace IV through a valve 6. In this case, CaO powder simultaneously formed from limestone powder is intermixed with the iron powder and fed into the furnace II. Further, both powders are heated to melt in the melting furnace II by the hot reducing gas tangentially blown in through the inlet tube 5, then gathering along the furnace wall by the action of cyclone, flowing down and collecting itself at the furnace bottom. 7 represents the molten metallic iron collected on the bottom of the furnace and 8 represents the slag formed. The molten iron and slag are taken out from time to time as the case may be. The reduced iron (Fe) powder supplied in the melting furnace II through the said valve 6 will sometimes be mixed with some iron ore powder unreduced, which however, will be reduced and melted perfectly by CO in the hot reducing gas in the melting furnace II. The reduction of iron oxide due to CO gas is slightly exothermic reaction even though weak, and moreover, the reduction goes on perfectly because of the high temperature gas. The appropriate temperature of the melting furnace II is around 1600° C. This temperature depends on the temperature of supplied gas, the temperature of iron powder supplied, the rate of supply thereof, the cooling characteristic of the furnace wall and the like. The gas withdrawn through a gas outlet tube 9 is blown tangentially at a high velocity in the said furnace III through an inlet 10 for the said furnace.

The powdered carbonaceous material such as carbon, coke and coal in a tank 12 for carbon powder is fed continuously through a valve 11 in this furnace III. This carbonaceous material, for instance, carbon is preheated by hot reducing gas in the furnace III and a part thereof combines with $CO_2$ gas contained in the gas blown in through the inlet 10 to give CO gas. Since this chemical reaction is endothermic, the temperature of the furnace III falls considerably to a lower temperature than that of the gas originally blown in. For instance, assuming that gas comes from the melting furnace II at a temperature of 1600° C., the furnace temperature of the furnace III will be approximately 1100° C. This temperature is dependent on the mixing rate of $CO_2$ in the gas blown in through the inlet 10; the cooling characteristic of the wall of furnace III and the like. Namely, the furnace III serves to change a gas mixture of $N_2$, CO and $CO_2$ blown in the said furnace III at approximately 1600° C. to a gas mixture of $N_2$ and CO of approximately 1100° C. as well as to preheat the carbon source material fed therein. Thus, the regulation of quality and the adjustment of temperature of the gas in the furnace III can be effectively effected. The reducing gas produced in the said furnace III can be tangentially blown in the heat-reduction furnace IV to produce a revolving hot gas current therein. Through said valve 11, a considerably large amount of carbon powder is supplied to the furnace III in an amount far greater than is required for converting $CO_2$ present to CO. The carbon powder introduced in the furnace III is preheated therein, gathered by the action of cyclone along the circumferential wall and dropped down to the furnace bottom to collect itself there, and thereafter, it can be fed to the top of furnace I through the valve 2 as set forth above. The hot reducing gas withdrawn through the outlet tube 13 of the furnace III is blown tangentially at a high velocity into the furnace IV through an inlet 14 to provide a revolving hot gas current therein. The powdered iron ore (FeO) preheated and preliminarily reduced in the furnace V and finely divided limestone mixed with said iron ore powder are supplied to the aforesaid furnace IV. This FeO powder is reduced to Fe by CO in the reducing gas blown in the furnace IV through the inlet 14, and the limestone powder is decomposed into $CO_2$ gas and CaO powder. Said Fe powder and CaO powder thus produced are gathered along the circumferential wall of the furnace IV and fall down and collect itself on the furnace bottom, and thereafter can continuously be supplied to the melting furnace II through the valve 6 as mentioned above. In the furnace IV, the iron ore powder is not sometimes entirely reduced to Fe powder. However, such unreduced iron ore can completely be reduced at the top of the furnace II by CO gas in the revolving hot reducing current blow therein. In this connection there is no fear that FeO powder remains in the melting furnace II unreduced. The temperature inside the furnace IV becomes approximately 1000° C. This temperature is dependent on the temperature of reducing gas blown in the said furnace IV, the temperature of powdered iron ore, the proportifion of gas to ore to be supplied, the cooling characteristic of the wall of furnace IV and the like. The appropriate lowering of the temperature inside the furnace IV by means of the hot reducing gas adequately adjusted by the operation of the furnace III serves to prevent the coherence of reduced iron powder in the furnace IV and its adhering to the furnace wall. The gas leaving the furnace IV through an outlet tube 16 is a mixture of $N_2$, CO and $CO_2$. This mixed gas is tangentially blown in the furnace V at a high temperature through an inlet tube 17. On the other hand, the powdered iron ore, for instance, hematite powder and pulverized limestone in the tank 19 for iron oxide ore and limestone as the slag forming material are supplied to the furnace V through a valve 18. These two materials are preheated in the furnace V and the powdered iron oxide ore is preliminarily reduced to FeO powder. The temperature inside the furnace V is approximately 700° C. This temperature is dependent on the temperature of gas to be supplied, the feed ratio of gas and iron ore, the cooling characteristic of the walls of the furnace V and the like. The iron ore powder and limestone powder which are supplied and preheated in the furnace V are collected around the wall by the function of cyclone and rendered to fall down and collect itself on the bottom of furnace, after which they can be fed to the furnace IV through a valve 15. The gas coming out through an outlet tube 20 is a gas mixture of $N_2$, CO and $CO_2$.

As apparent from the above description, the raw powdered iron ore is submitted to preliminary reduction as well as preheating in the furnace V, and thereafter reduced and preheated in the furnace IV, and further melted in the furnace II to become molten metallic iron. However, these operations are all performed by mere contact with the hot gas. Fine carbon powder as source material for making hot reducing gas is fed in the furnace I after passing through the furnace III, namely the ash contained in the said carbon powder collects itself on the bottom of the furnace I without coming in contact with the iron ore and metallic iron. Moreover, as the slag formation is low, this method contributes to the manufacture of high quality metallic iron. In addition, the amount of charging limestone can also be decreased.

According to the method of the present invention, the coal of strong caking property such as used in the usual blast furnace is not necessary as carbon source, and it is rather appropriate to use the anthracite of non-caking property. Even the coal which contains somewhat volatile matter may well be used, and the coal with rather high ash content may also be used. When steam is jetted at the gas inlet 10 for the furnace III or other suitable places in the furnace, $H_2O$ reacts with C at a high temperature to give $H_2$ and CO gases, namely a stronger reducing gas can be produced, and as this reaction is endothermic, the temperature inside the furnace III can also be controlled freely by adjusting the rate of supply of the steam. When the temperature of the furnace III is feared to me too high, the temperature can be controlled by using this progress. Moreover, it is also possible to preheat and dry the raw materials in a similar furnace superposed on the furnace V.

The temperatures shown in this embodiment are merely described by way of example. Therefore, an appropriate temperature should be chosen in accordance with the nature of pulverized iron ore and carbon powder. Particularly in the furnace IV, the temperature should be so chosen as to prevent Fe powder from caking with each other. This can be easily accomplished by controlling the gas temperature to be supplied from the furnace III to the furnace IV.

Furthermore, in the embodiment illustrated in Fig. 1, the melting furnace II can be dispensed with, if desired (see broken lines in Fig. 1), and the furnaces I and II can also be eliminated for the manufacture of reduced iron. In the latter case, ash can be separated in the furnace III. On the other hand, since in the furnaces I and II the operation can respectively be effected up to the melting of ash, metallic iron and slag, horizontal furnaces of cyclone type I and II tilted to some extent as shown in Fig. 2 may be used. The numeral references 1, 2, 3, 4, 5, 6, 7, 8 and 9 in Fig. 2 represent respectively the corresponding parts in Fig. 1.

In those horizontal cyclone furnaces I and II, the collection of fine powder is somewhat low, but there is an advantage in easy construction of the furnaces.

Moreover, Fig. 3 represents an embodiment in which the furnace I of Fig. 1 is eliminated and the collected carbon source material in the furnace III is intended to be fed in the melting furnace II, and the operating manner is similar to that shown in Fig. 1. In this embodiment, the furnace arrangements are made simpler than in the case shown in Fig. 1. Further, the metal reduced and collected in the reduction furnace IV is withdrawn by a discharging tube provided with a valve 6' as shown in broken line in Fig. 3, and thus the discharged reduced iron may be melted in another furnace. This manufacture of reduced iron can also be done in a like manner by the arrangements shown in Fig. 1. Furthermore, a suitable number of reduction and melting furnaces can, in parallel, be operated by the alteration of each respective furnace capacity, the regulation of an amount of carbon supplied, the amount of air supplied and the intermediate supplement of air or other gases.

In Fig. 1, there is also a favorable case in which the carbon source material is supplied in the furnace III in an amount necessary for the temperature control, the collected powder is charged in the furnace II, and to the furnace I the carbon source material is separately fed (the feeding amount thereof to the furnace I is by far larger as compared with those to the furnace III).

Furthermore, in the present invention, the furnaces I, II, III, IV and V can freely be arranged, as the case may be. On the other hand, the valve 6 of the heat-reduction furnace IV is required to be endowed with such a function that it renders the iron powder reduced in the furnace IV to fall in the furnace II continuously, while entering of the gas in the anterior furnace II into the posterior reduction furnace IV due to the greater pressure of the gas in said furnace II than that of the posterior furnace IV can be prevented. However, the design of such valve can freely be intended. Other valves 2, 11 and 15 should be endowed with the same function as that of the valve 6.

Further, in the present invention, the preliminary requirements of powdered ore and carbon for cyclone furnaces (for instance, selection of the degree of fineness) or the selection of suitable charging positions for each powdered material can suitably be changed within the scope of the object of this invention. It is also possible to supplement an oxygen, hydrogen, oxygen source or hydrogen source to the feeding gas or at other suitable places, if desired. As the raw material for making reducing atmosphere, the heavy oil and other liquid fuel or natural gas and other gaseous fuel can also be used in place of carbon.

In this case, as it is not required to collect ash, the furnaces I and II are not always necessary to be cyclone type so that the furnace I can, for example, be constructed as a simple gasification furnace and the furnace III can also be constructed in a separate form as a furnace for adjusting gas temperature.

Finally, the present invention is not only used for the reduction and melting of powdered iron ore, but other melting step can also be adopted after the reducing treatment has been carried out according to the present invention.

What I claim is:

1. The process of treating iron ores in a plurality of furnaces including a reduction furnace, a gas temperature regulating furnace, an ore melting furnace, a reducing gas generating furnace and a preheating furnace wherein all of the furnaces are of the cyclone type, comprising the steps of tangentially introducing a hot oxygen containing gas into said reducing gas generating furnace, simultaneously introducing a solid, high ash, reducing gas source material from said gas temperature regulating furnace into said reducing gas generating furnace thereby generating a reducing gas of a temperature sufficient to melt iron ore, centrally removing said reducing gas from said generating furnace and tangentially introducing said reducing gas into said melting furnace, introducing the heated and reduced iron ore powder and pulverized slag forming material from said reduction furnace into said melting furnace for the melting thereof, tangentially introducing the hot gas within said melting furnace into said gas temperature regulating furnace, introducing a controlled amount of solid high ash reducing gas source material into said gas temperature regulating furnace producing an endothermic reaction changing the $CO_2$ of the gas received from said melting furnace into CO thereby lowering the temperature of the resultant produced reducing gas to approximately 1000° C.–1100° C., centrally removing said last mentioned reducing gas from said gas temperature regulating furnace and tangentially introducing the same into said reduction furnace, introducing preheated iron ore powder and slag forming material from said preheating furnace into said reduction furnace and removing the molten iron and slag from said melting furnace.

2. In a process of treating iron ore comprising passing iron ore through a cyclone reduction furnace into a cyclone melting furnace including the steps of introducing hot gas of approximately 1600° C. from the melting furnace tangentially into a cyclone gas temperature regulating furnace, producing a reducing gas of approximately 1100° within said regulating furnace by introducing a solid high ash reducing gas source material into said regulating furnace, lowering the temperature of said reducing gas by the endothermic chemical reaction between said material and hot gas from said melting furnace and centrally removing said reducing gas from said regulating furnace and introducing the same tangentially into said reduction furnace.

References Cited in the file of this patent

UNITED STATES PATENTS

| | | |
|---|---|---|
| 2,184,300 | Hodson et al. | Dec. 26, 1939 |
| 2,530,078 | Ramsing | Nov. 14, 1950 |
| 2,745,734 | Oster | May 15, 1956 |
| 2,745,737 | Oster | May 15, 1956 |
| 2,756,981 | Muller | July 31, 1956 |
| 2,785,886 | Muller | Mar. 19, 1957 |
| 2,797,076 | Muller | June 25, 1957 |